United States Patent
Agrawal et al.

(10) Patent No.: US 10,187,270 B2
(45) Date of Patent: Jan. 22, 2019

(54) APPROACH TO VISUALIZE CURRENT AND HISTORICAL ACCESS POLICY OF A GROUP BASED POLICY

(71) Applicant: Cisco Technology, Inc., San Jose, CA (US)

(72) Inventors: Sanjay Agrawal, San Jose, CA (US); Ruchir Gupta, Fremont, CA (US); Syed Basheeruddin Ahmed, Santa Clara, CA (US); Yi Yang, Cary, NC (US); Meenakshi Kaushik, Santa Clara, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 207 days.

(21) Appl. No.: 14/997,342

(22) Filed: Jan. 15, 2016

(65) Prior Publication Data
US 2017/0206701 A1    Jul. 20, 2017

(51) Int. Cl.
| G06T 15/08 | (2011.01) |
| H04L 12/24 | (2006.01) |
| G06T 11/20 | (2006.01) |
| H04L 12/26 | (2006.01) |

(52) U.S. Cl.
CPC ............ *H04L 41/22* (2013.01); *G06T 11/206* (2013.01); *H04L 41/0893* (2013.01); *H04L 43/045* (2013.01); *G06T 2200/04* (2013.01); *G06T 2200/24* (2013.01); *H04L 41/065* (2013.01)

(58) Field of Classification Search
None
See application file for complete search history.

(56) References Cited

U.S. PATENT DOCUMENTS

| 5,889,953 A * | 3/1999 | Thebaut .................. G06F 21/30 709/221 |
| 6,556,199 B1 * | 4/2003 | Fang ..................... G06T 15/005 345/424 |

* cited by examiner

*Primary Examiner* — Edward Martello
(74) *Attorney, Agent, or Firm* — Polsinelli PC

(57) ABSTRACT

Systems, methods, and non-transitory computer-readable storage media for visualizing current and historical access policy of a group based policy. A first group based policy and a second group based policy are received at a computing device, where each group based policy includes policy rules defining a range of destination internet protocol addresses, a range of source internet protocol addresses and a range of access ports. The computing device renders a three dimensional representation of the first group based policy, based on the policy rules of the first group based policy. The computing device renders a three dimensional representation of the second group based policy, based on the policy rules of the second group based policy. The computing device displays the representations of the first group based policy and second group based policy on a graphical interface.

20 Claims, 8 Drawing Sheets

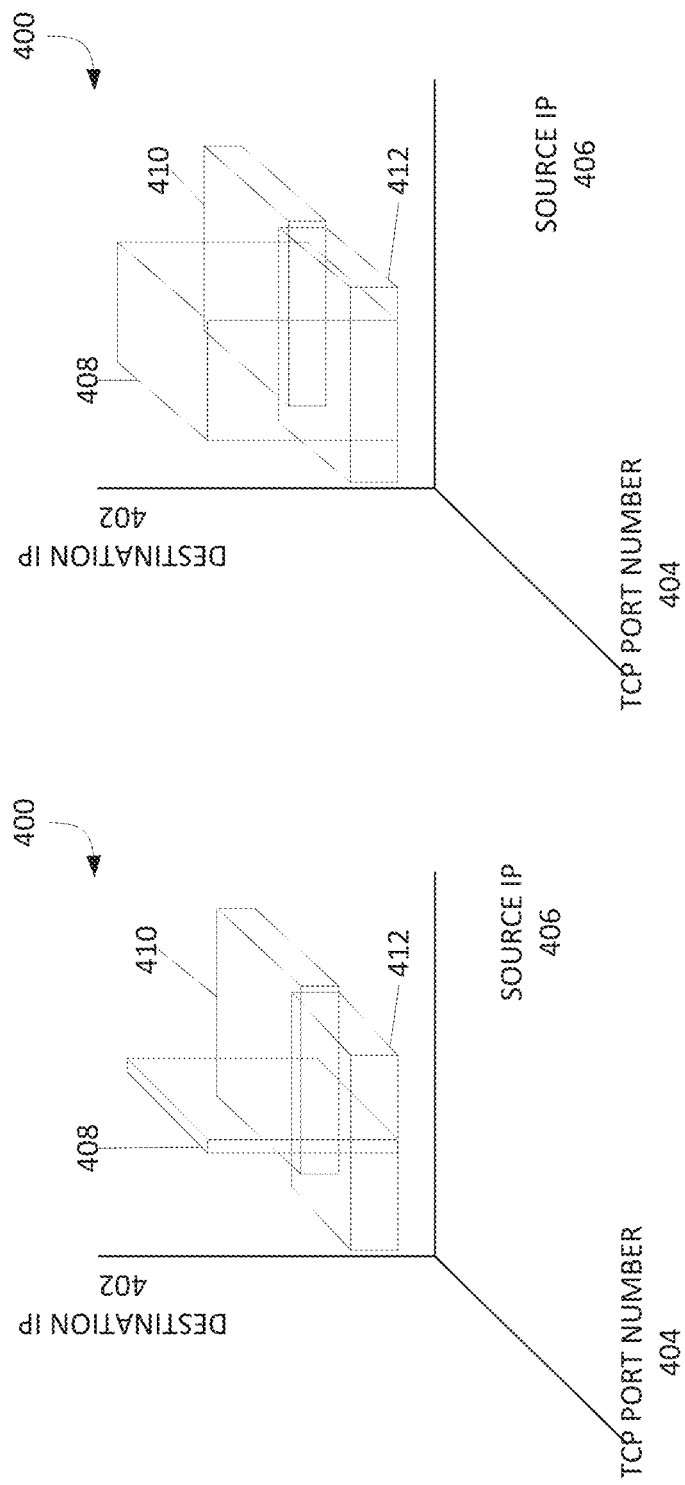

APPROACH TO VISUALIZE CURRENT AND HISTORICAL ACCESS POLICY OF A GROUP BASED POLICY

TECHNICAL FIELD

This disclosure relates in general to the field of computer networks and, more particularly, pertains to visualization of a policy management.

BACKGROUND

A number of complex issues can arise with cloud based networking. For example, network conflicts can occur between contracts or policies. Additionally, it can be difficult to understand, visualize, and/or manage the conflicting policies of the cloud based network.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only examples of the disclosure and are not therefore to be considered to be limiting of its scope, the principles herein are described and explained with additional specificity and detail through the use of the accompanying drawings in which:

FIGS. 4A-4C illustrate an example three-dimensional UI displaying adjusting GBP representation;

DETAILED DESCRIPTION

Figure 1:
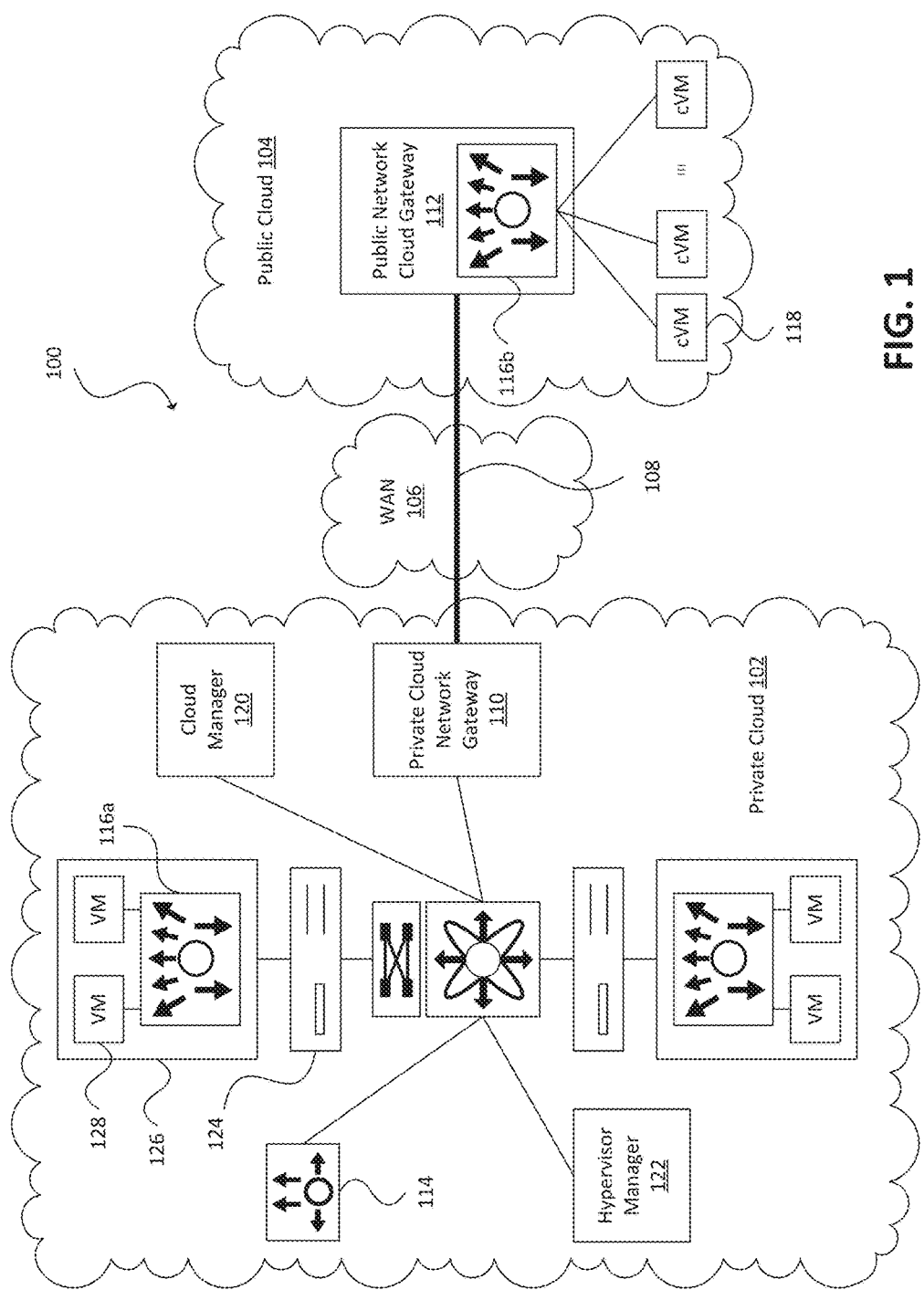
FIG. 1 illustrates an example cloud network environment.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.
Overview:

Disclosed are systems, methods, and computer-readable storage media for visualizing current and historical group based policy of a group based policy. Various embodiments of the present technology can be used to receive a first group based policy and a second group based policy, each group based policy including policy rules defining a range of destination internet protocol addresses, a range of source internet protocol addresses and a range of access ports, render a three dimensional representation of the first group based policy based on the policy rules of the first group based policy, render a three dimensional representation of the second group based policy based on the policy rules of the second group based policy, and display the three dimensional representation of the first group based policy and the three dimensional representation of the second group based policy on a graphical interface.

DETAILED DESCRIPTION

A computer network is a geographically distributed collection of nodes interconnected by communication links and segments for transporting data between endpoints, such as personal computers and workstations. Many types of networks are available, with the types ranging from local area networks (LANs) and wide area networks (WANs) to overlay and software-defined networks, such as virtual extensible local area networks (VXLANs).

LANs typically connect nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 6 (L6) networks and devices.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by an intermediate network node, such as a router, to extend the effective "size" of each network.

Overlay networks generally allow virtual networks to be created and layered over a physical network infrastructure. Overlay network protocols, such as Virtual Extensible LAN (VXLAN), Network Virtualization using Generic Routing Encapsulation (NVGRE), Network Virtualization Overlays (NVO6), and Stateless Transport Tunneling (STT), provide a traffic encapsulation scheme which allows network traffic to be carried across L2 and L6 networks over a logical tunnel. Such logical tunnels can be originated and terminated through virtual tunnel end points (VTEPs).

Moreover, overlay networks can include virtual segments, such as VXLAN segments in a VXLAN overlay network, which can include virtual L2 and/or L6 overlay networks over which virtual machines (VMs) communicate. The virtual segments can be identified through a virtual network identifier (VNI), such as a VXLAN network identifier, which can specifically identify an associated virtual segment or domain.

Network virtualization allows hardware and software resources to be combined in a virtual network. For example, network virtualization can allow multiple numbers of VMs to be attached to the physical network via respective virtual LANs (VLANs). The VMs can be grouped according to their respective VLAN, and can communicate with other VMs as well as other devices on the internal or external network.

Network segments, such as physical or virtual segments; networks; devices; ports; physical or logical links; and/or traffic in general can be grouped into a bridge or flood domain. A bridge domain or flood domain can represent a broadcast domain, such as an L2 broadcast domain. A bridge domain or flood domain can include a single subnet, but can also include multiple subnets. Moreover, a bridge domain can be associated with a bridge domain interface on a network device, such as a switch. A bridge domain interface can be a logical interface which supports traffic between an L2 bridged network and an L6 routed network. In addition, a bridge domain interface can support internet protocol (IP) termination, VPN termination, address resolution handling, MAC addressing, etc. Both bridge domains and bridge domain interfaces can be identified by a same index or identifier.

Furthermore, endpoint groups (EPGs) can be used in a network for mapping applications to the network. In particular, EPGs can use a grouping of application endpoints in a network to apply connectivity and policy to the group of applications. EPGs can act as a container for buckets or collections of applications, or application components, and tiers for implementing forwarding and policy logic. EPGs also allow separation of network policy, security, and forwarding from addressing by instead using logical application boundaries.

Cloud computing can also be provided in one or more networks to provide computing services using shared resources. Cloud computing can generally include Internet-based computing in which computing resources are dynamically provisioned and allocated to client or user computers or other devices on-demand, from a collection of resources available via the network (e.g., "the cloud"). Cloud computing resources, for example, can include any type of resource, such as computing, storage, and network devices, virtual machines (VMs), etc. For instance, resources may include service devices (firewalls, deep packet inspectors, traffic monitors, load balancers, etc.), compute/processing devices (servers, CPU's, memory, brute force processing capability), storage devices (e.g., network attached storages, storage area network devices), etc. In addition, such resources may be used to support virtual networks, virtual machines (VM), databases, applications (Apps), etc.

Cloud computing resources may include a "private cloud," a "public cloud," and/or a "hybrid cloud." A "hybrid cloud" can be a cloud infrastructure composed of two or more clouds that inter-operate or federate through technology. In essence, a hybrid cloud is an interaction between private and public clouds where a private cloud joins a public cloud and utilizes public cloud resources in a secure and scalable manner. Cloud computing resources can also be provisioned via virtual networks in an overlay network, such as a VXLAN.

An example cloud network environment is illustrated in FIG. 1. The example cloud network environment can include a plurality of networks or clouds, such as the hybrid cloud network including a private cloud 102 (e.g., an enterprise virtual datacenter) and a public cloud 104 separated by a WAN 106, such as the Internet. Although a hybrid cloud is sometimes defined as consisting of a private cloud and a public cloud, it should be understood that many aspects of this disclosure can be practiced in various configurations (e.g., two or more public clouds hosted by third party cloud providers and/or two or more private clouds of an enterprise located in different locations). The private cloud 102 and the public cloud 104 can be integrated using overlay network techniques, such as VXLAN, NVGRE, NVO6, STT, or other overlay network protocols known to those of ordinary skill. The private cloud 102 and public cloud 104 can be connected via a site-to-site tunnel or communication link 108 between a private cloud network gateway 110 and a public cloud network gateway 112. The private cloud network gateway 110 can be configured as a VM for extending the private cloud across the Internet to the public cloud 104 through the site-to-site tunnel 108. The public cloud network gateway 112 can be configured as a VM switch overlay for interconnecting workloads running in the public cloud 104 via secure access tunnels, and for forwarding network traffic to the private network 102 using the site-to-site tunnel 108. In an example embodiment, the private cloud network gateway 110 can be implemented using Intercloud Fabric™ Extender (ICX) from Cisco®, Systems, Inc. of San Jose, Calif., the public cloud network gateway 112 can be implemented using Intercloud Fabric™ Switch (ICS) from Cisco®, and the ICX/ICS pair can form an Intercloud Fabric™ Cloud (ICFCloud).

In some embodiments, the private cloud network gateway 110 can establish, from the private cloud 102, the secure site-to-site tunnel 108 to interconnect with the public cloud network gateway 112, and interact with a virtual switch controller or Virtual Supervisor Module (VSM) 114. The VSM 114 can serve as a network controller for managing the network and security policies of the overlay network. In an example embodiment, the VSM 114 can be implemented in an active-standby model to ensure high availability, with a first VSM functioning in a primary role and a second VSM functioning in a secondary role. If the first VSM fails, the second VSM can take over control. A virtual chassis model can be used to represent VSM 114 and each virtual switch or Virtual Ethernet Module (VEM) under the VSM's control or within the VSM's domain, such as VEM 116a in the private cloud and public cloud VEM 116b. The high availability pair of VSMs 114 can be associated with slot numbers 1 and 2 in the virtual chassis, and the VEMs 116a and 116b can be sequentially assigned to the remaining slots. In the virtual chassis model, VSM 114 may be configured to provide control plane functionality for the virtual switches or VEMs 116a and 116b. The VEMs 116a and 116b can provide network connectivity and switching capability for VMs hosted on a corresponding server like a line card in a modular switching platform, and can operate as part of a data plane associated with the control plane of VSM 114. Unlike multiple line cards in a single chassis, each VEM can act as an independent switch from a forwarding perspective. In some example embodiments, the VEMs 116a and 116b may form a distributed virtual switch that can be controlled by the VSM 114. In an example embodiment, the VSM 114 and VEMs 116a and 116b can be implemented using Cisco Nexus® 1000V Series Switches.

The private cloud 102 can also include a hybrid cloud manager 120, which can be a management plane VM for auto-provisioning resources within the hybrid cloud network environment 100. The hybrid cloud manager 120 can be a management platform running in the private cloud 102, and may be responsible for providing hybrid cloud operations, translating between private cloud and public cloud interfaces, managing cloud resources, instantiating cloud gateways and cloud VMs though a private virtualization platform or hypervisor manager 122 and public cloud provider application programming interfaces (APIs). Hybrid cloud manager 120 may also monitor the health of all of the components of the network (e.g., cloud gateways, VMs, and communication links) and ensure high availability of those components.

In some embodiments, hybrid cloud manager 120 can be implemented as a virtual appliance, such as the Intercloud Fabric™ Director (ICFD) from Cisco®. The ICFD can be a hybrid cloud orchestration component that can provide a single point of management and consumption of hybrid cloud resources. That is, the ICFD can offer a single console so that users can provision workloads and associated policies. The ICFD can also expose northbound APIs, which allow users to programmatically manage their workloads in the hybrid cloud environment 100 or integrate with other cloud management platforms.

In some embodiments, a user can monitor and manage group-based policies (GBP) of a cloud environment by accessing cloud manager 120 on a mobile device. A group in a group-based policy (GBP) can represent a collection of network endpoints or endpoint groups (EPGs). A policy can include policy rules or contracts that define allowed communications between endpoints according to the groups that the endpoints belong to. For example, a policy may allow traffic between two endpoint groups. In another example, a policy may be to make a copy of data packets transmitted between two endpoint groups. As one that is skilled in the art will recognize, a policy is a flexible tool used to define numerous functions within a network. Other examples of policies include redirect, deny, change quality of service (QoS), encrypt, drop, etc.

In some embodiments, policies can be applied in a bidirectional fashion. In other embodiments, policy parameters can be different for data going in one direction versus another direction.

The EPGs can be based on a number of different characteristics. For example, an endpoint group can be based on a subnet, an internet protocol (IP) address (e.g. destination IP or source IP), a virtual local area network (VLAN), a virtual extensible local area network (VXLAN), a media access control (MAC) address, a domain name server (DNS) name or range, network services, security services, network storage, access ports, etc. or any combination thereof. Those that are skilled in the art will recognize that EPGs are very flexible and can be defined based on any number of different factors. For instance, EPGs can be used to efficiently define policy within a network. By defining policies according to EPGs rather than individual endpoints, the scalability of the policy table can be greatly increased. As such, the GBP can describe a range of each traffic classifier between EPGs.

In some embodiments, the user interface (UI) on the mobile device of the user can render or generate a visual representation of each GBP of the cloud network. By visualizing the GBPs of the cloud environment, the user can easily understand the relationships between multiple contracts/policies occurring within the cloud environment. For example, two conflicting policies of a cloud environment can be visualized as two overlapping GBP representations.

Each GBP representation can be at least based on one of the traffic classifiers of the GBP (e.g. destination IP, source IP and port range). The visual renderings however, can be either a three-dimensional UI or a two-dimensional UI. For example the three-dimensional UI can include three axis and each axis can represent a traffic classifier (e.g. one axis corresponds to a range of destination IPs, another axis corresponds to a range of source IPs and the third axis corresponds to a range of access ports—all of which are related to the same cloud environment). Accordingly, the positioning of each GBP representation can be according to the traffic classifier of each axis.

Figure 2:
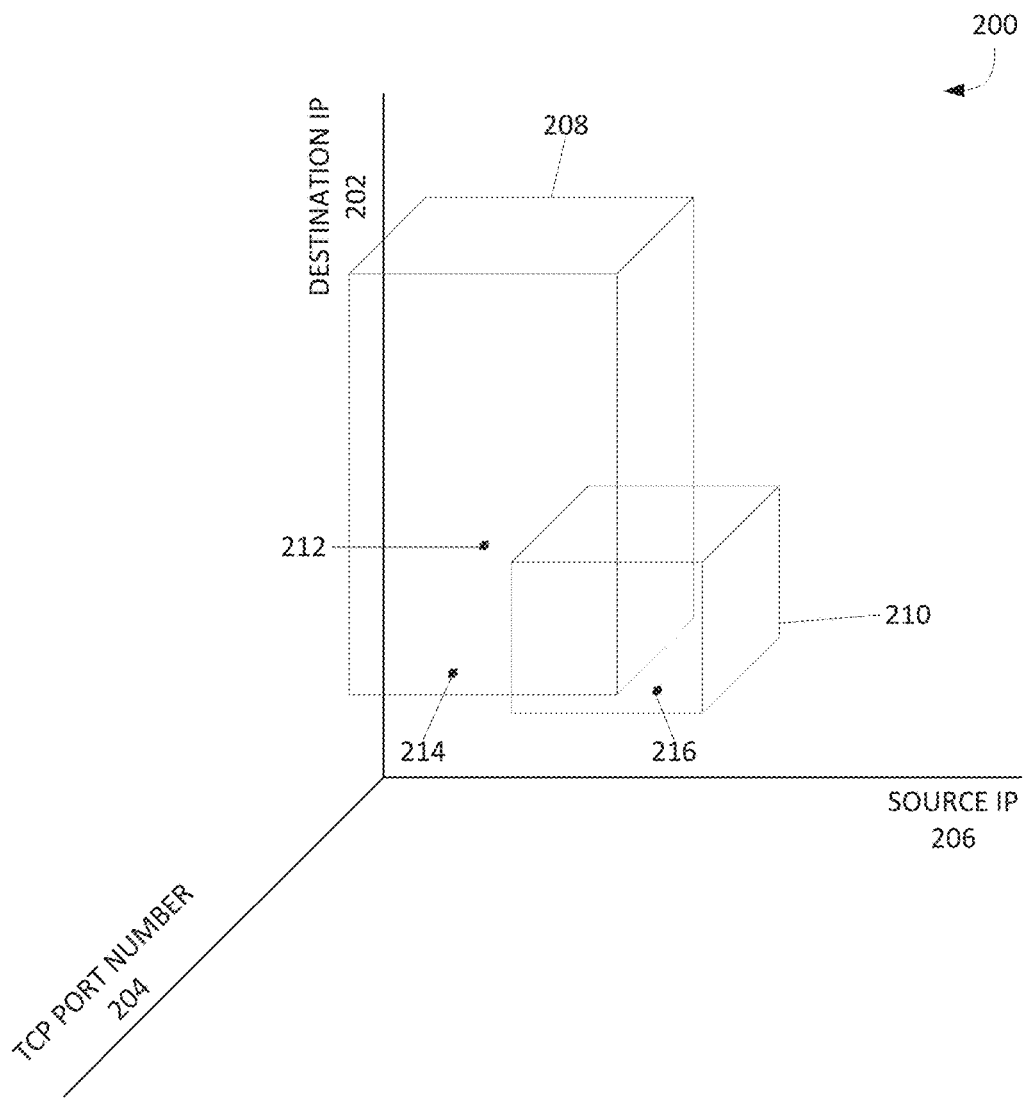
FIG. 2 illustrates an example three-dimensional UI displaying a first group based policy (GBP) representation and a second GBP representation.

FIG. 2 illustrates an example three-dimensional UI. UI 200 includes three axis, destination IP 202, TCP port number 204 and source IP 206. Destination IP 202 corresponds to a range of destination IP addresses. TCP port number 204 corresponds to a range of an access port. In some embodiments the axis could represent another access port. For instance user datagram protocol (UDP). Source IP 206 corresponds to a range of source IP addresses. UI 200 additionally includes a first GBP representation 208 and a second GBP representation 210. It would be intuitive for a user, looking at UI 200 to be able to understand the extent of the first GBP policy coverage (represented by first GBP representation 208) and the second GBP policy coverage (represented by second GBP representation 210). In some embodiments, each GBP representation is visually distinct from each other (e.g. different colors, patterns, opacity/transparency, fill styles, line styles, or any combination thereof).

UI 200 also visualizes a conflict in policies between the first GBP and the second GBP. The overlapping portions between first GBP representation 208 and second GBP representation 210 represent a conflict in network policies between the first GBP and second GBP. In some embodiments, cloud manager 120 notifies the user on the mobile device of the conflicting network policies. In other embodiments, cloud manager 120 automatically adjusts the conflicting GBPs so the conflicting GBPs no longer conflict.

In some embodiments, the UI can also visualize real live traffic flows occurring in the cloud environment. For instance the UI can overlay representations of real live traffic flows on the GBP representation(s). Referring back to FIG. 2, UI 200 also includes representations of multiple real live traffic flows 212, 214, 216. This allows the user to be able to monitor and intuitively visualize the relationship between real live traffic flows and the GBP(s) of the cloud environment. Real live traffic flows can be represented in a number of different ways (e.g. a sphere, a pyramid, a cuboidal shape, a square, a circle, a triangle, different colors, different patterns, varying opacity/transparency, different fill styles, different line styles, or any combination thereof). Real live traffic flows 212, 214, 216 in UI 200 are represented as cuboidal in shape.

Figure 3:
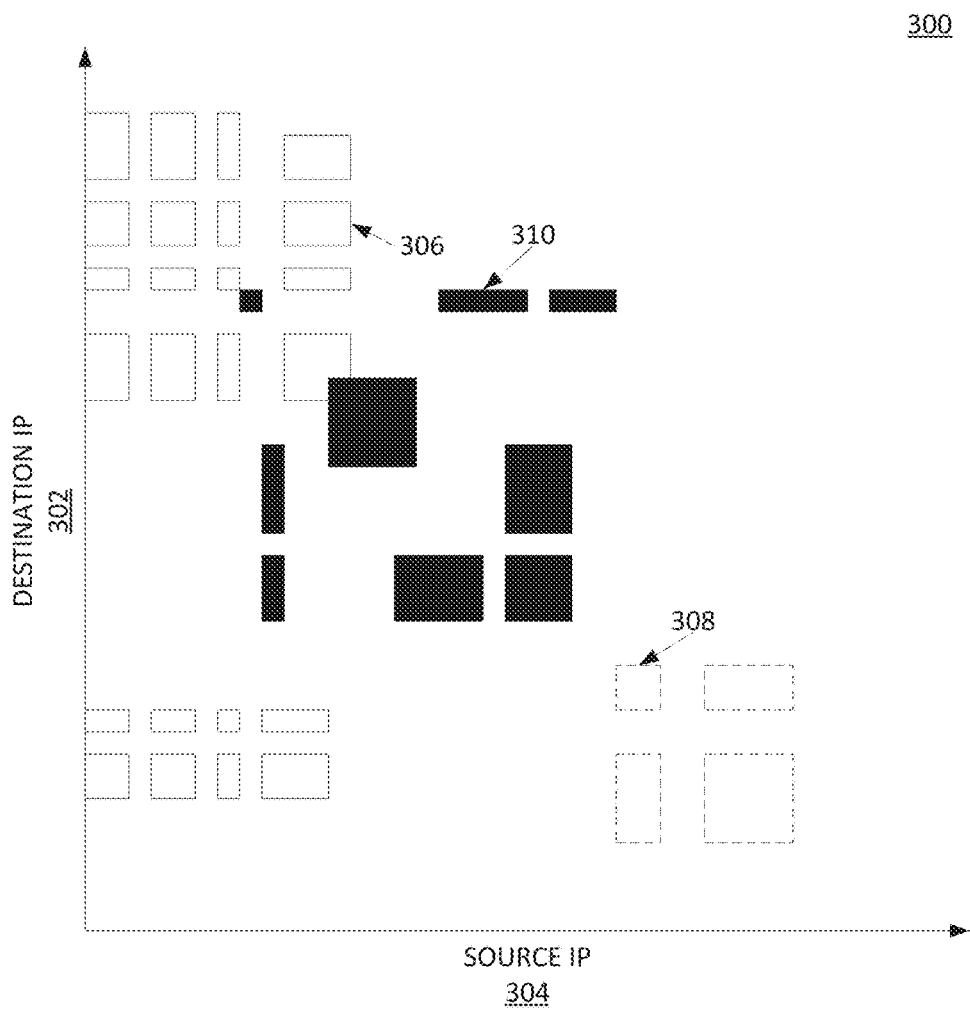
FIG. 3 illustrates an example two-dimensional UI.

In some embodiments the three-dimensional UI is visualized in a two-dimensional perspective. For instance, the user switches from a three-dimensional UI to a two-dimensional UI. An example of a two-dimensional UI perspective is shown in FIG. 3. Using the same axis as FIG. 2, FIG. 3 is the two dimensional perspective of axis destination IP 302 and axis source IP 304. UI 300 includes three different GBP representations, 306, 308 and 310. GBP representations 306, 308 and 310 are also visually distinct from each other by their differing fill styles and line styles. Furthermore, as illustrated in FIG. 3, conflicts can also be visualized in the two-dimensional UI. For example, a conflict exists between GBP 306 and 310. In some embodiments, GBP representations 306, 308 and 310 are a collection of real-live traffic flows. Each real-live traffic flow is represented by a dot, and each collection of dots can take any shape and be visualized to represent a single GBP. Furthermore, the shape of the collection of dots or real-live traffic flows of GBP 306, 308 and 310, in the two-dimensional UI, can be reflected and represented in the corresponding three-dimensional UI. In some embodiments, when the user interacts with the two-dimensional UI, information about the third (hidden dimension) is displayed. For example, UI 300 in the two-dimensional UI perspective is not showing the third dimension or axis TCP port number. As such if the user interacted with GBP representation 306, the UI generates a message window indicating TCP port number corresponding to GBP representation 306. UI 300 would present the same information if UI 300 were displayed in the three-dimensional UI perspective. In some embodiments real-live traffic flow representations is also displayed in the two-dimensional UI perspective.

In some situations, a user adjusts or changes the policy of a GBP. In some embodiments, due to conflicting policies, cloud manager 120 automatically adjusts or changes conflicting policies to ensure that they no longer conflict. In either case, the UI accordingly updates or adjusts the GBP representations to reflect any policy adjustments. In some embodiments the UI replaces GBP representations with an updated rendering of the adjusted GBP representations. In other embodiments, the adjusted GBP representations are also represented in a two-dimensional UI perspective.

Figure 4C:
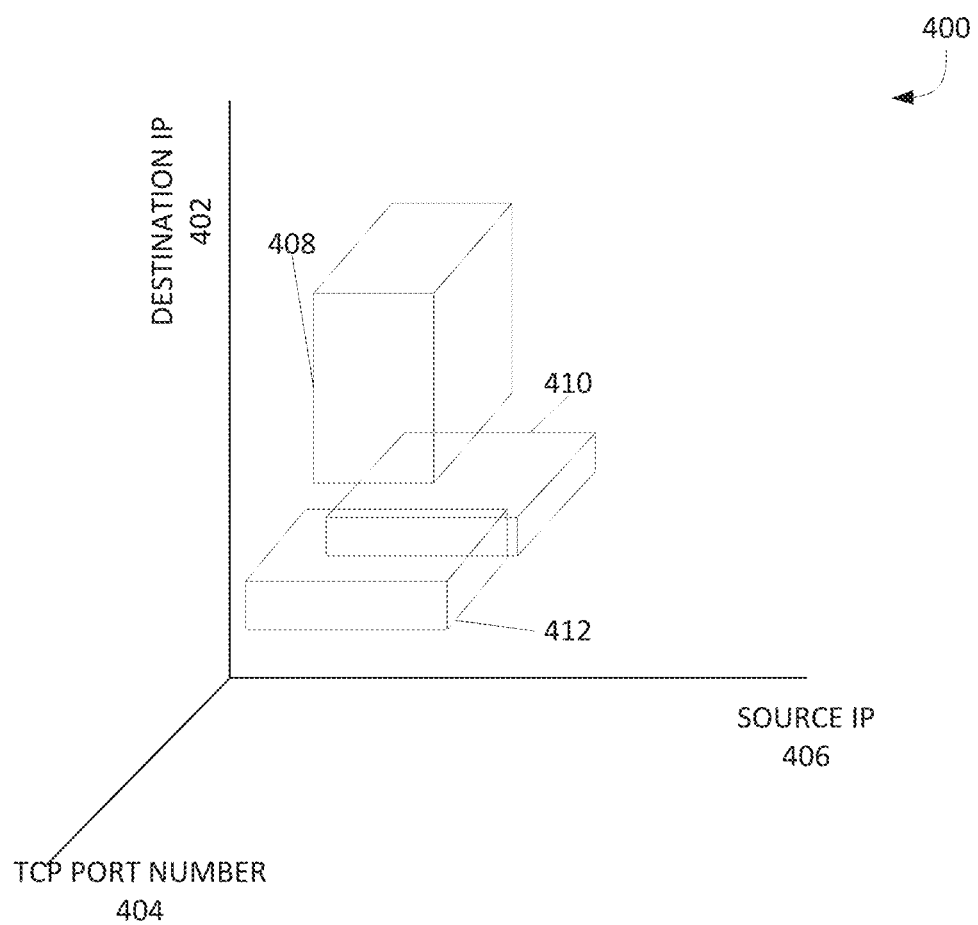

FIGS. 4A-4C illustrate an example three-dimensional UI adjusting the GBP representations to reflect policy adjustments. For simplicity sake, FIGS. 4A-4C also illustrate the three-dimensional UI using the same axis as FIG. 2. FIG. 4A illustrates GBP 408, 410 and 412 before any policy changes or adjustments occur. FIG. 4B illustrates a change or adjustment in the policy of corresponding GBP representation 208. Specifically, the broadening of GBP representation 408, where the broadening of GBP representation 408 corresponds to a broadening of coverage of its policy. As such, whatever policy adjustments are actually occurring, UI 400 reflects the same adjustments to GBP representation 408. However, in UI 400, the policies are still conflicting (as shown by the overlapping GBP representations 408, 410 and 412). In some embodiments, the user adjusts or cloud manager 120 automatically adjusts the policies of the corresponding GBPs to ensure that the policies are no longer conflicting. FIG. 4C illustrates that change in the policies of the GBP to ensure that the policies are no longer conflicting. In FIG. 4C, UI 400 displays GBP representation 408 at a higher destination IP range to display to the user, in an intuitive way, that the GBP of GBP representation 408 is no longer in conflict.

In some embodiments, instead of adjusting the policies of conflicting GBPs, the GBPs can be given different priorities. For example, as illustrated in FIG. 4A, GBP 408 can be given a higher priority than GBPs 410 and 412. As such, where there are policy conflicts between GBP 408, 410 and 412, the traffic flow with conflicting policies will only be enforced by the policy of GBP 408. In other embodiments, GBPs can be removed if conflicts between GBPs exist. For example, as illustrated in FIG. 4A, either GBP 408 can be removed or GBP 410 and 412 can be removed to resolve the conflict. In other embodiments, the GBPs can be removed and given priorities. For example, as illustrated in FIG. 4A, GBP 410 can be removed and GBP 408 can be given a higher priority than GBP 412. As such, where GBP 408 and 412 conflicts, the traffic flow with conflicting policies will only be enforced by the policy of GBP 408.

Similar to the sequence of FIGS. 4A-4C, in some embodiments the UI displays the representations of the GBP over time. In other embodiments, the display of GBP representations over time includes real-live traffic flow representations. In some embodiments the UI can also visualize current and historical quality of service in relation to GBPs differentiated services code point (DSCP), bandwidth, latency, and jitter of a GBP of a cloud environment.

Cloud environments can be comprised of multiple GBPs and at any given moment users can remove or add GBPs. As such keeping track of newly added, recently removed or previously existing GBPs can be difficult. In some embodiments, the UI can make visually distinct newly added or recently removed GBPs, thereby making for a more intuitive UI for the user. For instance, a newly added or recently removed GBP can be presented as visually distinct from each other and to pre-existing GBPs already represented on the UI (e.g. different colors, patterns, opacity/transparency, fill styles, line styles, or any combination thereof).

Figure 5:
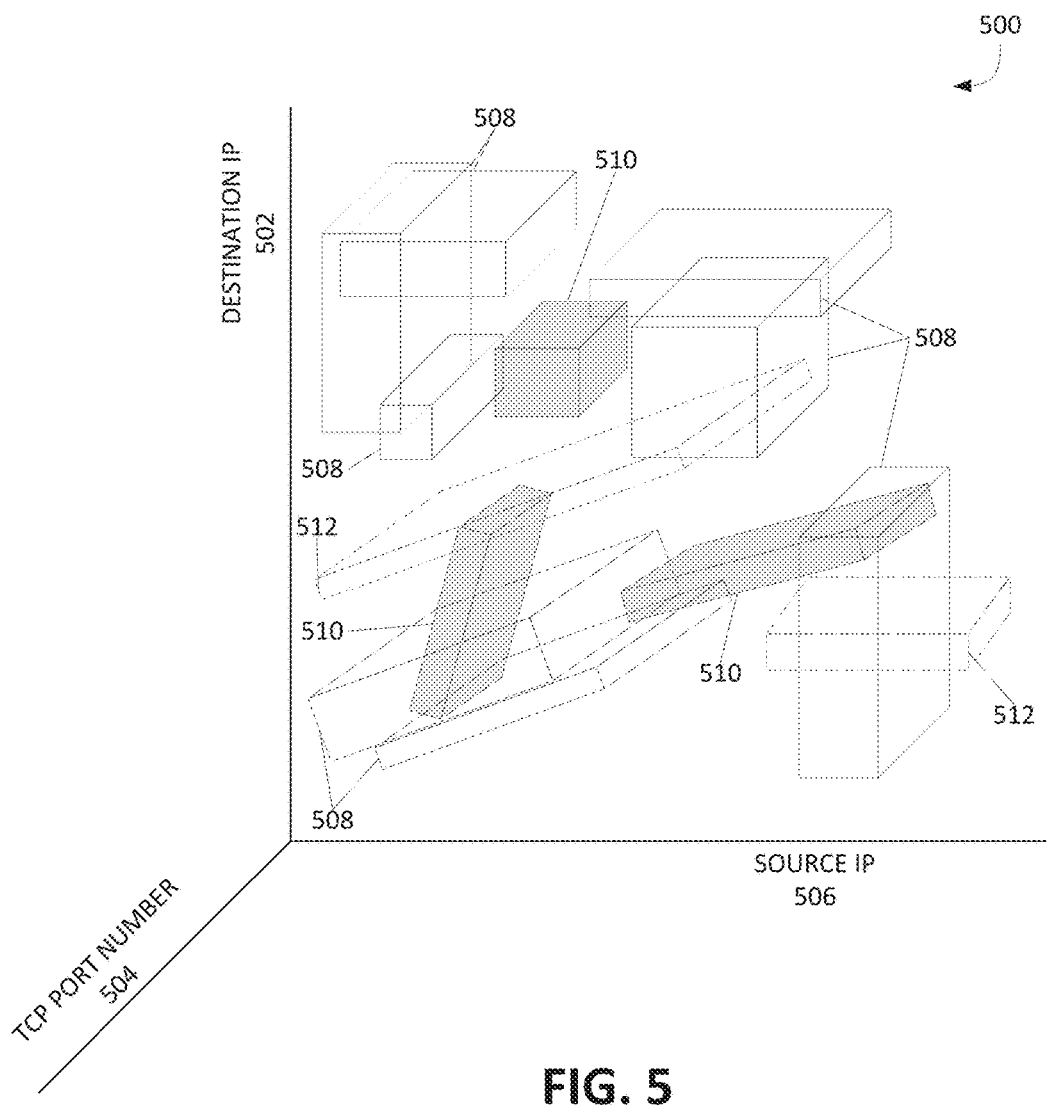
FIG. 5 illustrates a UI that visually distinguishes between recently added, removed or previously existing GBPs and corresponding GBP representations.

FIG. 5 illustrates a UI that visually distinguishes between recently added, removed or previously existing GBPs. UI 500 illustrates a three-dimensional UI using the same axis as FIG. 2. Additionally, UI 500 includes existing GBP 508, recently added GBP 510 and recently removed GBP 512, all of which are visually distinct from one another. Furthermore, existing GBP 508 corresponds to still existing GBP representations; recently added GBP 510 corresponds to the GBP/policy recently added by the user; and recently removed GBP 512 corresponds to the GBP/policy recently removed by the user. In some embodiments newly added, recently removed or previously existing GBP representations are also represented in a two-dimensional UI perspective.

In some situations, the GBP may be static or dynamical. Static policies are fixed and usually tied with the life cycle of the policies of related EPGs. Dynamic policies are not fixed and usually alter its parameters or other policy's parameters in response to some change in the cloud environment. These dynamical policies provide good supplemental services and at times it is necessary for dynamical policies to override the static policies. In some embodiments cloud manager 120 executes dynamical policies. When dynamical policies conflict with static policies the user may not know why the cloud environment is suddenly not working as it once was. For example, in an initial set up, a user authors a static policy to allow http traffic between a web service endpoint group, and an application group. During the operation, the infrastructure detects DoS packets have been sent from the application group to web service group. Thus cloud manager 120 automatically executes a dynamic access policy to block these malicious packets. In such an event, the end user may be confused why the traffic was blocked. Having a UI, similar to FIG. 2, to display that a dynamical policy is overriding the static policy will help the user understand what is occurring. For instance, similar to FIG. 2, the representations of a dynamical policy and a static policy is displayed on a three dimensional UI. Any overlapping between the dynamical policy representation and the static policy representation will intuitively indicate as a conflict.

In some embodiments, the dynamical policy representations and the static policy representations are also represented in a two-dimensional UI perspective. In other embodiments, real-live traffic flow representations can also be included in the UI with the dynamical policy representations and the static policy representations. In some embodiments dynamical policy representations and static policy representations are visually distinct from one another (e.g. different colors, patterns, opacity/transparency, fill styles, line styles, or any combination thereof). This can help the user more easily distinguish between representations that are for the dynamical policy and for the static policy. In other embodiments, the UI displays the representations of the static policy and dynamical policy over time.

Referring back to FIG. 1, the private cloud 102 can include one or more physical servers 124 that each deploy a hypervisor 126 (also sometimes referred to as a virtual machine manager or a virtual machine monitor (VMM)). The hypervisor 126 may be computer software, firmware, or hardware that creates and runs one or more VMs, such as VMs 128 or cVMs 118. Although the cVMs 118 are not shown to be encapsulated by a hypervisor in this example, it will be appreciated that VMs may or may not be managed by a hypervisor. The hypervisor 126 can provide a respective operating system to one or more VMs. In some example embodiments, the hypervisor 126 may be a native or "bare metal" hypervisor that runs directly on hardware, but that may alternatively run under host software executing on hardware. The hypervisor 126 can be managed by the virtualization platform or hypervisor manager 122, such as vSphere® from VMware®, Inc. of Palo Alto, Calif., Hyper-V® from Microsoft® Corp. of Seattle, Wash., XenServer® from Citrix® Systems, Inc. of Santa Clara, Calif., or Red Hat® Enterprise Virtualization from Red Hat®, Inc. of Raleigh, N.C.

Each VM, including VMs 128 and cVMs 118, can host a private application. In some example embodiments, each public cloud VM 118 may be connected to the public cloud network gateway 112 via secure access tunnels, as discussed elsewhere herein. In some example embodiments, one or more cVMs 118 can be configured to operate as a public cloud firewall (not shown), such as an Intercloud Fabric™ Firewall or Virtual Security Gateway (VSG) from Cisco®. In some example embodiments, one or more cVMs 118 can be configured to operate as a public cloud router (not shown), such as an Intercloud Fabric™ Router or Cloud Services Router (CSR) from Cisco®.

In some example embodiments, the public cloud network gateway 112 can establish, from the public cloud 104, the secure site-to-site tunnel 108 to interconnect with the private cloud network gateway 110, secure access tunnels to connect public cloud VMs (cVMs) 118, and monitor and report statistics for the public cloud VMs and any component failures in the public cloud 104. In some example embodiments, the private cloud network gateway 110 and the public cloud network gateway 112 can be deployed as a high-availability pair to provide redundancy. In some example embodiments, the public cloud network gateway 112 can include a cloud virtual switch or cloud Virtual Ethernet Module (cVEM) 116b that communicates with the VSM 114 to retrieve VM-specific network policies (e.g., port profiles), switches network traffic between public cloud VMs 118, switches network traffic between public cloud VMs and the private cloud 102, applies network policies, and monitors and reports VEM-related statistics.

In some example embodiments, each physical server, such as physical server 124, hosting a VM, including VM 128 and cVM 118, can include multiple Virtual Network Interface Cards (VNICs) (not shown) for providing specific functionality, such as control and/or data/packet transmission. For example, a VM on a physical server can include a vNIC that may be connected to a VEM, such as VEM 116a or cVEM 116b, for connecting the VM or cVM to the network. Each physical server 124 can include a vNIC for enabling control functionality, such as Small Computer Systems Interface over IP (iSCSI), Network File System (NFS) access, migration of VMs or cVMs, directly connected tunnels, discussed elsewhere herein, as well as other control functionality.

In some example embodiments, each public cloud VM 118 can include an agent (not shown) that provides for the network overlay logic for the public cloud VM. The agent can be deployed in the cVM as a secure tunnel driver. The agent can establish a secure access tunnel to connect the public cloud VM 118 to the public cloud network gateway 112, and monitor and report secure overlay-related statistics. In an example embodiment, the agent can be implemented using Intercloud Fabric™ Agent (ICA) from Cisco®.

In some example embodiments, the secure site-to-site tunnel or communication link 108 can take one of several forms, such as various types of virtual private networks (VPNs) or Layer 2 (L2) tunneling protocols. For example, some example embodiments may utilize an open VPN (e.g., OpenVPN) overlay or an IP Security (IPSec) VPN based L6 network extension to provide the communication link 108. Some example embodiments may utilize a secure transport layer (i.e., L4) tunnel as the communication link 108 between the private cloud network gateway 110 and the public cloud network gateway 112, where the secure transport layer tunnel 108 can be configured to provide a link layer (i.e., L2) network extension between the private cloud 102 and the public cloud 104. Some example embodiments may establish the secure transport layer (i.e., L4) tunnel 108 (e.g., Transport Layer Security (TLS), Datagram TLS (DTLS), Secure Socket Layer (SSL), etc.) over the public network 104, and can build a secure L2 switch overlay that interconnects public cloud resources with private clouds (e.g., enterprise network backbones). In other words, the secure transport layer tunnel 108 can provide a link layer network extension between the private cloud 102 and the public cloud 104.

In an example embodiment, the private cloud network gateway 110 can use an L4 secure tunnel as the communication link 108 to connect to the cloud resources allocated in the public cloud 104. The L4 secure tunnel may be well-suited for use with corporate firewalls and Network Address Translation (NAT) devices due to the nature of the transport level protocols (e.g., UDP/TCP) and the transport layer ports opened for HTTP/HTTPS in the firewall. The L2 network can thus be further extended and connected to each of the cloud VMs 118 through the public cloud network gateway 112. With an L2 network overlay, instances of a particular private application VM can be seamlessly migrated to the overlay network dynamically created in the public cloud 104, without substantial impact to existing corporate infrastructure.

Figure 6:
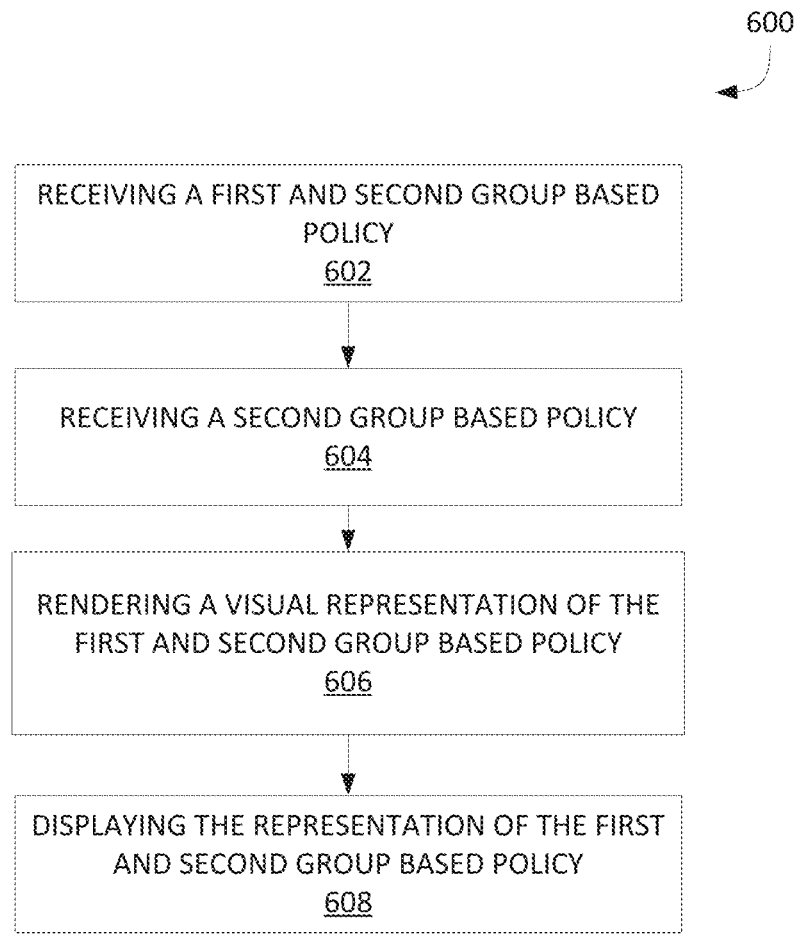
FIG. 6 illustrates an example method for rendering, in three dimensions, a visual representation of GBPs in a cloud environment.

Reference is now made to FIG. 6. FIG. 6 illustrates an example method for rendering, in three dimensions, a visual representation of GBPs in a cloud environment. At step 602 and 604 of example method 600, the mobile device receives a first and second GBP. For example, a user, on their mobile device, receives a first and second GBP from cloud manager 120. In some embodiments, the user can only receive GBPs when authorization is granted to the mobile device to access cloud manager 120. Each GBP includes policy rules. For example the first and second GBP can include policy rules defining a range of destination IPs, source IPs and a range of access ports between EPGs.

At step 606, the mobile device renders a visual representation based on the policy rules of each GBP. For example, the mobile device can render a three dimensional a representation of the first and second GBP, based on the policy rules of the first and second GBP. In some embodiments, the mobile device renders the GBP representations to be in two dimensions. In other embodiments the representations are visually distinct from one another (e.g. different colors, patterns, opacity/transparency, fill styles, line styles, or any combination thereof). In some embodiments, the GBPs represent static or dynamic policies.

At step 608, the mobile device displays each GBP representation on a UI. For example, the mobile device can display, on a three dimensional UI, the first and second GBP rendered at step 606. Furthermore, the three dimensional UI is also based on the same policy rules or traffic classifiers as the GBP representations. An example UI in three dimensions is shown in FIG. 2. Both UI 200 and first GBP representation 208 and second GBP representation 210 are based on traffic classifiers destination IP, source IP and TCP port number. In some embodiments, the user, using the mobile device, switches between the two dimensional UI perspective and a three-dimensional UI perspective. In other embodiments, the user can still gain access to data of the hidden third dimension or axis while in the two dimensional UI perspective.

In some embodiments, the mobile device receives updated GBP data from cloud manager 120. For example, if there are any policy changes or adjustments of a GBP, the mobile device accordingly updates the corresponding GBP representation. This is similarly illustrated in FIGS. 4A-4C. In some embodiments, if there are actual conflicts between policies or GBP, cloud manager 120 adjusts the policies or GBP to ensure that they don't conflict and then sends the data to the mobile device to update the corresponding GBP representations. In other embodiments, a new rendered updated GBP representation replaces the outdated GBP representation.

In other embodiments, the mobile device receives from cloud manager 120 data describing real-live traffic flow of the cloud environment. As such, the mobile device renders a representation of the real-live traffic flow, similar to that illustrated and described in FIG. 2. In some embodiments each real-live traffic flow representation is visually distinctive from one another.

In some embodiments, the mobile device accesses cloud manager 120 to add or remove GBPs. In such instances, recently removed and newly added GBPs or policies are visually distinctive from one another and from existing GBPs. Thereby allowing users to easily distinguish and keep track of newly add or recently remove GBPs. An example of this UI similarly illustrated in FIG. 5.

Figure 7A:
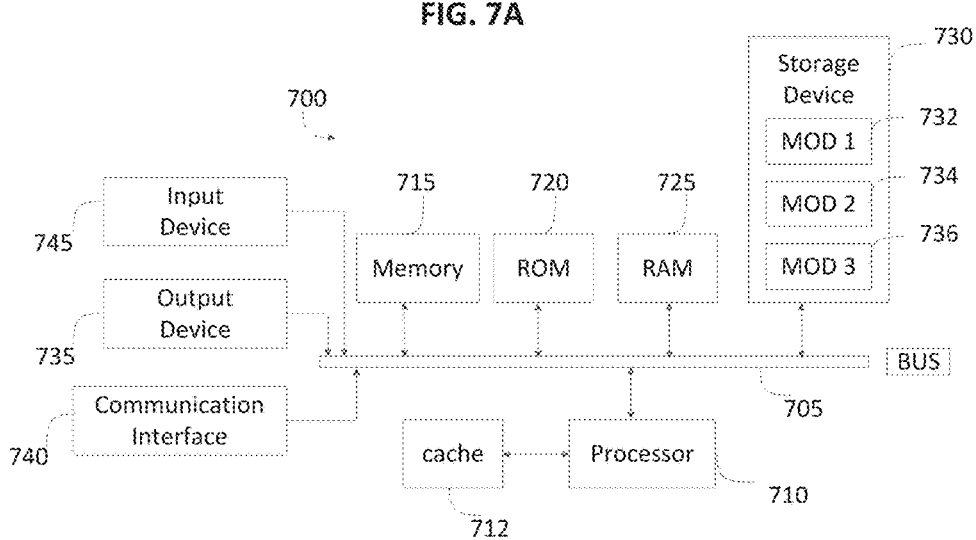
FIGS. 7A and 7B illustrate an example system embodiments according to some aspects of the subject technology.
Figure 7B:
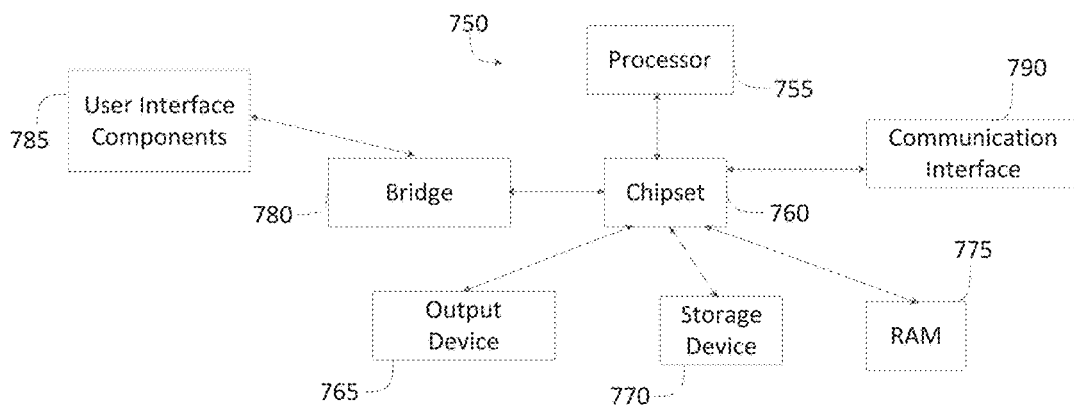

FIG. 7A and FIG. 7B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 7A illustrates a conventional system bus computing system architecture 700 wherein the components of the system are in electrical communication with each other using a bus 705. Exemplary system 700 includes a processing unit (CPU or processor) 710 and a system bus 705 that couples various system components including the system memory 715, such as read only memory (ROM) 720 and random access memory (RAM) 725, to the processor 710. The system 700 can include a cache of high-speed memory connected directly with, in close proximity to, or integrated as part of the processor 710. The system 700 can copy data from the memory 715 and/or the storage device 760 to the cache 712 for quick access by the processor 710. In this way, the cache can provide a performance boost that avoids processor 710 delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware module or software module, such as module 1 762, module 2 764, and module 6 766 stored in storage device 760, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing device 700, an input device 745 can represent any number of input mechanisms, such as a microphone for speech, a touch-sensitive screen for gesture or graphical input, keyboard, mouse, motion input, speech and so forth. An output device 765 can also be one or more of a number of output mechanisms known to those of skill in the art. In some instances, multimodal systems can enable a user to provide multiple types of input to communicate with the computing device 700. The communications interface 740 can generally govern and manage the user input and system output. There is no restriction on operating on any particular hardware arrangement and therefore the basic features here may easily be substituted for improved hardware or firmware arrangements as they are developed.

Storage device 760 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 760 can include software modules 762, 764, 766 for controlling the processor 710. Other hardware or software modules are contemplated. The storage device 760 can be connected to the system bus 705. In one aspect, a hardware module that performs a particular function can include the software component stored in a computer-readable medium in connection with the necessary hardware components, such as the processor 710, bus 705, display 765, and so forth, to carry out the function.

FIG. 7B illustrates a computer system 750 having a chipset architecture that can be used in executing the described method and generating and displaying a graphical user interface (GUI). Computer system 750 is an example of computer hardware, software, and firmware that can be used to implement the disclosed technology. System 750 can include a processor 755, representative of any number of physically and/or logically distinct resources capable of executing software, firmware, and hardware configured to perform identified computations. Processor 755 can communicate with a chipset 760 that can control input to and output from processor 755. In this example, chipset 760 outputs information to output 765, such as a display, and can read and write information to storage device 770, which can include magnetic media, and solid state media, for example. Chipset 760 can also read data from and write data to RAM 775. A bridge 780 for interfacing with a variety of user interface components 785 can be provided for interfacing with chipset 760. Such user interface components 785 can include a keyboard, a microphone, touch detection and processing circuitry, a pointing device, such as a mouse, and so on. In general, inputs to system 750 can come from any of a variety of sources, machine generated and/or human generated.

Chipset 760 can also interface with one or more communication interfaces 790 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 755 analyzing data stored in storage 770 or 775. Further, the machine can receive inputs from a user via user interface components 785 and execute appropriate functions, such as browsing functions by interpreting these inputs using processor 755.

It can be appreciated that exemplary systems 700 and 750 can have more than one processor 710 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

For clarity of explanation, in some instances the present technology may be presented as including individual functional blocks including functional blocks comprising devices, device components, steps or routines in a method embodied in software, or combinations of hardware and software.

Note that in certain example implementations, the optimization and/or placement functions outlined herein may be implemented by logic encoded in one or more tangible, non-transitory media (e.g., embedded logic provided in an application specific integrated circuit [ASIC], digital signal processor [DSP] instructions, software [potentially inclusive of object code and source code] to be executed by a processor, or other similar machine, etc.). The computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as

What is claimed is:

1. A computer implemented method comprising:
receiving, by a computing device, a first group based policy having first policy rules and a second group based policy having second policy rules, the first policy rules defining a first range of destination internet protocol addresses, a first range of source internet protocol addresses and a first range of access ports, the second policy rules defining a second range of destination internet protocol addresses, a second range of source internet protocol addresses and a second range of access ports;
based on the first policy rules of the first group based policy, rendering, by the computing device, a first three dimensional representation of the first group based policy;
based on the second policy rules of the second group based policy, rendering, by the computing device, a second three dimensional representation of the second group based policy;
displaying, on the computing device, the first three dimensional representation of the first group based policy and the second three dimensional representation of the second group based policy on a graphical interface; and
displaying a conflict between the first policy rules and the second policy rules via an overlap in the first three dimensional representation of the first group based policy and the second three dimensional representation of the second group based policy on the graphical interface.

2. The computer implemented method of claim 1, wherein rendering the first three dimensional representation of the first group based policy further comprises:
rendering the first range of destination internet protocol addresses of the first group based policy on a first axis of the first three dimensional representation;
rendering the first range of source internet protocol addresses of the first group based policy on a second axis of the first three dimensional representation, the second axis adjoining the first axis; and
rendering the first range of access ports of the first group based policy on a third axis of the first three dimensional representation, the third axis adjoining the first axis and the second axis.

3. The computer implemented method of claim 1, further comprising:
receiving flow data describing a destination internet protocol address, a source internet protocol address, and an access port; and
rendering a representation of the flow data on the graphical interface.

4. The computer implemented method of claim 1, wherein the access ports are transmission control protocol ports.

5. The computer implemented method of claim 1, further comprising:
receiving a third group based policy, the third group based policy including third policy rules defining a third range of destination internet protocol addresses, a third range of source internet protocol addresses and a third range of access ports;
based on the third policy rules of the third group based policy, rendering a third three dimensional representation of the third group based policy; and
displaying the third three dimensional representation of the third group based policy on the graphical interface, wherein the third three dimensional representation of the third group based policy is visually distinct from first the three dimensional representation of the first group based policy and the second three dimensional representation of the second group based policy.

6. The computer implemented method of claim 1, further comprising:
in response to a determination that the first group based policy has been deleted, deleting the first three dimensional representation of the first group based policy on the graphical interface.

7. The computer implemented method of claim 1, further comprising:
receiving modifications to the first group based policy; and
in response to receiving the modifications to the first group based policy, modifying the first three dimensional representation of the first group based policy on the graphical interface based on the modifications.

8. A non-transitory computer-readable medium containing instructions that, when executed by a computing device, cause the computing device to:
receive a first group based policy including first policy rules defining a first range of destination internet protocol addresses, a first range of source internet protocol addresses, and first a range of access ports;
receive a second group based policy including second policy rules defining a second range of destination internet protocol addresses, a second range of source internet protocol addresses, and second a range of access ports;
based on the first policy rules of the first group based policy, render a first three dimensional representation of the first group based policy;
based on the second policy rules of the second group based policy, render a second three dimensional representation of the second group based policy;
display the first three dimensional representation of the first group based policy and the second three dimensional representation of the second group based policy on a graphical interface; and
display a conflict between the first policy rules and the second policy rules via an overlap in the first three dimensional representation of the first group based policy and the second three dimensional representation of the second group based policy on the graphical interface.

9. The non-transitory computer-readable medium of claim 8, wherein the instructions to render in the first three dimensional representation of the first group based policy further cause the computing device to:
render the first range of destination internet protocol addresses of the first group based policy on a first-axis of the first three dimensional representation;
render the first range of source internet protocol addresses of the first group based policy on a second-axis of the first three dimensional representation, the second axis adjoining the first axis; and
render the first range of access ports of the first group based policy on a third-axis of the first three dimensional representation, the third axis adjoining the first axis and the second axis.

10. The non-transitory computer-readable medium of claim 8, wherein the instructions further cause the computing device to:
receive flow data describing a destination internet protocol address, a source internet protocol address, and an access port; and
render a representation of the flow data on the graphical interface.

11. The non-transitory computer-readable medium of claim 10, wherein the access ports are user datagram protocol ports.

12. The non-transitory computer-readable medium of claim 8, wherein the instructions further cause the computing device to:
receive a third group based policy, the third group based policy including policy rules defining a third range of destination internet protocol addresses, a third range of source internet protocol addresses, and a third range of access ports;
based on the third policy rules of the third group based policy, render a third three dimensional representation of the third group based policy; and
display the third three dimensional representation of the third group based policy on the graphical interface, wherein the third three dimensional representation of the third group based policy is visually distinct from the first three dimensional representation of the first group based policy and the second three dimensional representation of the second group based policy.

13. The non-transitory computer-readable medium of claim 8, wherein the instructions further cause the computing device to:
in response to a determination that the first group based policy has been deleted, delete the first three dimensional representation of the first group based policy on the graphical interface.

14. The non-transitory computer-readable medium of claim 8, wherein the instructions further cause the computing device to:
receive modifications to the first group based policy; and
in response to receiving the modifications to the first group based policy, modify the first three dimensional representation of the first group based policy on the graphical interface based on the modifications.

15. A computing system comprising:
one or more computer processors; and
a memory containing instructions that, when executed by the one or more computer processors, cause the computing system to:
receive a first group based policy including first policy rules defining a first range of destination internet protocol addresses, a first range of source internet protocol addresses, and a first range of access ports;
receive a second group based policy including second policy rules defining a second range of destination internet protocol addresses, a second range of source internet protocol addresses, and a second range of access ports;
based on the first policy rules of the first group based policy, render a first three dimensional representation of the first group based policy;
based on the second policy rules of the second group based policy, render a second three dimensional representation of the second group based policy; and
display the first three dimensional representation of the first group based policy and the second three dimensional representation of the second group based policy on a graphical interface.

16. The computing system of claim 15, wherein rendering the first three dimensional representation of the first group based policy further comprises:
rendering the first range of destination internet protocol addresses of the first group based policy on a first axis of the first three dimensional representation;
rendering the first range of source internet protocol addresses of the first group based policy on a second axis of the first three dimensional representation, the second axis adjoining the first axis; and
rendering the first range of access ports of the first group based policy on a third axis of the first three dimensional representation, the third axis adjoining the first axis and the second axis.

17. The computing system of claim 15, wherein the instructions further cause the computing system to:
receive flow data describing a destination internet protocol address, a source internet protocol address, and an access port; and
render a representation of the flow data on the graphical interface.

18. The computing system of claim 15, wherein the instructions further cause the computing system to:
receive a third group based policy, the third group based policy including policy rules defining a range of destination internet protocol addresses, a range of source internet protocol addresses and a range of access ports;
based on the third policy rules of the third group based policy, render a third three dimensional representation of the third group based policy; and
display the third three dimensional representation of the third group based policy on the graphical interface, wherein the third three dimensional representation of the third group based policy is visually distinct from the first three dimensional representation of the first group based policy and the second three dimensional representation of the second group based policy.

19. The computing system of claim 15, wherein the instructions further cause the computing system to:
in response to a determination that the first group based policy has been deleted, delete the first three dimensional representation of the first group based policy on the graphical interface.

20. The computing system of claim 15, wherein the instructions further cause computing system to:
receive modifications to the first group based policy; and
in response to receiving the modifications to the first group based policy, modify the first three dimensional representation of the first group based policy on the graphical interface based on the modification.

* * * * *